United States Patent
Witucki et al.

(10) Patent No.: US 7,832,936 B2
(45) Date of Patent: Nov. 16, 2010

(54) AXIAL DELASH MECHANISM

(75) Inventors: David E. Witucki, Bay City, MI (US); Thomas M. Tighe, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 983 days.

(21) Appl. No.: 11/607,250

(22) Filed: Dec. 1, 2006

(65) Prior Publication Data
US 2008/0131043 A1 Jun. 5, 2008

(51) Int. Cl.
*F16C 33/02* (2006.01)
*B62B 37/00* (2006.01)
*B21K 1/76* (2006.01)

(52) U.S. Cl. .................. 384/295; 264/261; 29/898.07

(58) Field of Classification Search ............... 384/129, 384/130, 138, 192, 193, 215, 216, 226, 227, 384/247, 252, 261, 262, 275, 240, 243–246, 384/295, 428; 264/261, 262, 263; 403/268, 403/269; 29/898.049, 898.05, 898.07
See application file for complete search history.

(56) References Cited

U.S. PATENT DOCUMENTS

| | | | |
|---|---|---|---|
| 4,509,386 A | 4/1985 | Kimberlin | 74/492 |
| 4,509,775 A | 4/1985 | Arndt | 280/779 |
| 5,098,505 A * | 3/1992 | Goel et al. | 156/307.3 |
| 5,213,000 A * | 5/1993 | Saya et al. | 74/425 |
| 5,399,025 A * | 3/1995 | Higuchi et al. | 384/428 |
| 5,417,614 A | 5/1995 | Dykema et al. | 464/162 |
| 6,684,831 B2 | 2/2004 | Grau | 123/90.16 |
| 6,941,817 B2 | 9/2005 | King et al. | 73/761 |
| 2005/0044961 A1 | 3/2005 | King et al. | 73/761 |
| 2006/0117898 A1 | 6/2006 | Schneider et al. | 74/492 |

FOREIGN PATENT DOCUMENTS

EP 0 699 574 A3 2/1995

OTHER PUBLICATIONS

US 6,435,973, 08/2002, Hubbard et al. (withdrawn)

* cited by examiner

*Primary Examiner*—Thomas R Hannon
*Assistant Examiner*—James Pilkington
(74) *Attorney, Agent, or Firm*—Cantor Colburn LLP

(57) ABSTRACT

A method for delashing a shaft assembly and an assembly embodying the method are disclosed. The assembly includes a housing having a bore extending therethrough, and a shaft mounted within the bore. A shoulder extends into the bore to define a constriction along the bore. A bushing is positioned on an end of the shaft such that at least a portion of the bushing is spaced apart from the shoulder to define a cavity therebetween when the shaft is in the bore. A filler material is disposed in the cavity between the bushing and the shoulder for maintaining an axial compressive load on the shaft. In another aspect, a plug formed from a fusible material is provided. The plug includes a base portion and a plurality of channels disposed along an exterior of the base portion for enabling a flow of melted plug material along the channels.

8 Claims, 2 Drawing Sheets

AXIAL DELASH MECHANISM

BACKGROUND OF THE INVENTION

This invention relates generally to shaft assemblies and, more particularly, to a mechanism and method for delashing a shaft assembly.

One problem associated with shaft assemblies involves axial play or backlash between the shaft and the components to which it is mounted. This backlash, which is a function of the manufacturing and assembly tolerances associated with the shaft assembly components, may cause uneven wear, noise, and poor response when the axial position of the shaft shifts from a predetermined desired position. Examples of shaft assemblies which may experience these problems include worm gear assemblies, ball-screw/ball-nut drives, and power telescoping steering systems. In power telescoping steering systems, for example, a small gear set mounted to a shaft is used to actuate the steering column telescoping function. In each of the above cases, due to stack-up component tolerances and the loads applied to the shaft, there is a potential for axial clearance and lash in the shaft, resulting in the previously noted problems.

Methods for alleviating axial backlash in the shaft assembly include the application of either a tensile or compressive axial load to the shaft, to adjust the axial position of the shaft and to maintain the shaft in a predetermined (and, ideally, lash-free) position. One existing method of applying the axial loads is via a set screw mounted in a threaded hole formed coaxially with the shaft. The screw is turned until contact is made with a polymeric cap applied to an end of the shaft to be delashed. Additional turns of the screw drive the screw more deeply into the hole and cause the screw to bear down on the end of the shaft, thereby applying an axial compressive load which delashes the shaft. However, this delashing method is labor-intensive and relatively time-consuming, because the screw must be adjusted back and forth within the hole while the motor electrical current is monitored to ascertain the amount of compression on the shaft and the resulting suitability of the delash setting. In addition, it is desirable to either prevent or remove the axial backlash without adding substantial friction to the assembly which would degrade the overall performance.

SUMMARY OF THE INVENTION

The above discussed and other drawbacks and deficiencies of existing delash methods are overcome or alleviated in a shaft assembly including a housing having a bore extending therethrough, and a shaft mounted within the bore. A shoulder extends into the bore and a bushing is positioned on an end of the shaft such that at least a portion of the bushing is spaced apart from the shoulder to define a cavity therebetween when the shaft is positioned within the bore. In addition, a filler material is disposed in the cavity between the bushing and the shoulder for maintaining an axial compressive load on the shaft.

In another aspect of the present invention, a plug is provided, the plug being formed from a fusible material. The plug includes a base portion and a plurality of channels disposed along an exterior of the base portion for enabling a flow of melted plug material along the channels.

In yet another aspect of the present invention, a method for delashing a shaft in a shaft assembly is provided. The method includes the steps of providing a housing having a bore extending therethrough for receiving a shaft therein, the bore including a shoulder extending into the bore; providing a bushing on an end of the shaft such that at least a portion of the bushing is spaced apart from the shoulder to define a cavity therebetween when the shaft is positioned within the bore; applying an axial compressive load to the shaft; and inserting a filler material into the cavity between the bushing and the shoulder to engage the bushing and the shoulder for maintaining an axial compressive load on the shaft.

The above discussed and other features and advantages of the present invention will be appreciated and understood by those skilled in the art from the following detailed description and drawings.

DETAILED DESCRIPTION

Figure 1:
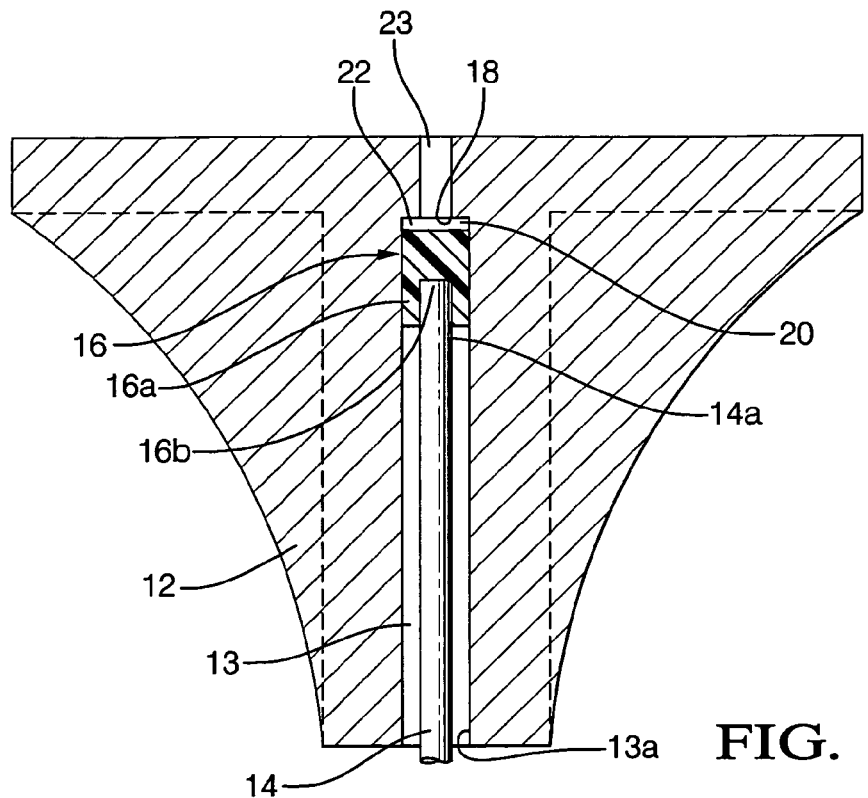
FIG. 1 is a cross-sectional side view of a portion of a shaft assembly in accordance with a first embodiment of the present invention.

FIG. 1 shows a portion of a shaft assembly in accordance with a first embodiment of the present invention. In the embodiment shown in FIG. 1, the shaft assembly is part of a power telescoping steering systems. One of ordinary skill in the art will appreciate various methods of construction for the various components of the shaft assembly. Referring to FIG. 1, the shaft assembly includes a housing 12, a shaft 14, and a bushing 16 mounted on an end 14a of shaft 14. Housing 12 is a known housing suitable for mounting therein shaft 14 and also for mounting a motor and gears (not shown) used for enabling powered adjustments to a tilt steering column by a vehicle occupant. Shaft 14 is an axle shaft coupled to an electric motor (not shown) and/or a gear train (also not shown). Housing 12 includes a bore 13 extending therethrough for mounting of shaft 14 therein. An annular shoulder 18 extends into bore 13 from a wall 13a of the bore to define a constriction 23 along the bore. Bushing 16 includes an annular wall 16a defining a cavity 16b for receiving shaft end 14a therein. Bushing 16 is positioned on shaft end 14a such that at least a portion of the bushing is spaced apart from shoulder 18 to define a cavity 20 therebetween when shaft 14 is positioned within bore 13.

A filler material 22 is disposed in cavity 20 between bushing 16 and shoulder 18. After application of an axial compressive load to end 14a of shaft 14, filler material 22 is inserted into cavity 20, substantially filling the cavity and engaging shoulder 18 and bushing 16 for maintaining the axial compressive load on the shaft, thereby helping to ensure substantially lash-free operation of the shaft. In the embodiment shown in FIG. 1, bushing 16 is dimensioned to engage a portion of the bore interior, such as wall 13a of the bore, for rotatably positioning shaft 14 relative to the wall of the bore. Thus, in this embodiment, shaft 14 is rotatable within bushing 16 after insertion of the shaft into the bushing.

In general, it is desirable that filler material 22 possess good flow characteristics when in melted or otherwise flowable form, and also relatively low coefficients of static and dynamic friction when in the cooled or solid form. It is also desirable that the filler material possess low shrinkage, so that after drying or cooling, the material still substantially fills the space between shoulder 18 and bushing 16, thus maintaining the compressive axial load applied to shaft 14. Also, in one particular embodiment, filler material 22 is a thermoplastic material. In another particular embodiment, filler material 22 is an epoxy. In cases where the filler material is a thermoplastic material, desirable characteristics of the filler material may include low melt viscosity (to provide flowability) and a relatively low melt temperature (for ease of processing). Other filler material properties may also be desirable, depending on design requirements.

Figure 3:
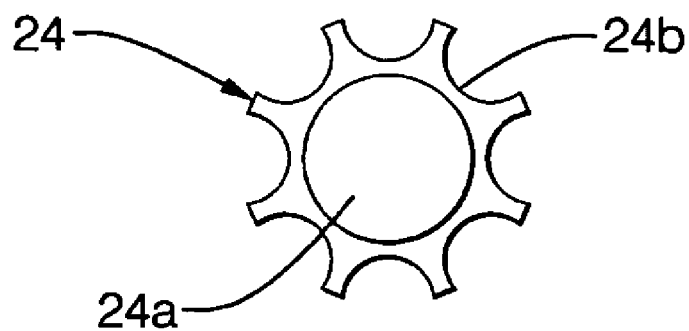
FIG. 3 is a plan view of a fusible plug in accordance with the present invention.
Figure 4:
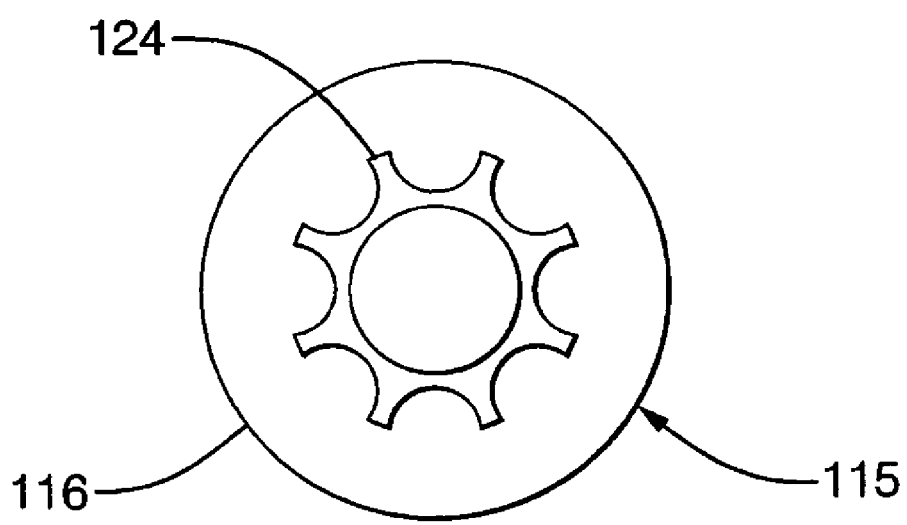
FIG. 4 is a plan view of a combination fusible plug-bushing in accordance with the present invention.

Referring to FIG. 3, in one particular embodiment, prior to insertion of the filler material into cavity 20, the filler material is in the form of a plug 24 made from a fusible material, such as a thermoplastic or other suitable material. Plug 24 has a base portion 24a and a plurality of flutes or channels 24b disposed along an exterior of the base portion. Channels 24b are designed to enable a flow of melted plug material along the channels, in a manner described in grater detail below. The length and other dimensions of the plug 24 may be varied according to the amount of filler material needed to substantially fill cavity 20. Referring to FIG. 4, in another particular embodiment, a combination bushing/plug 115 is provided by forming a bushing 116 unitarily (i.e., as a single piece) with a plug 124, at an end portion of the plug.

Figure 2:
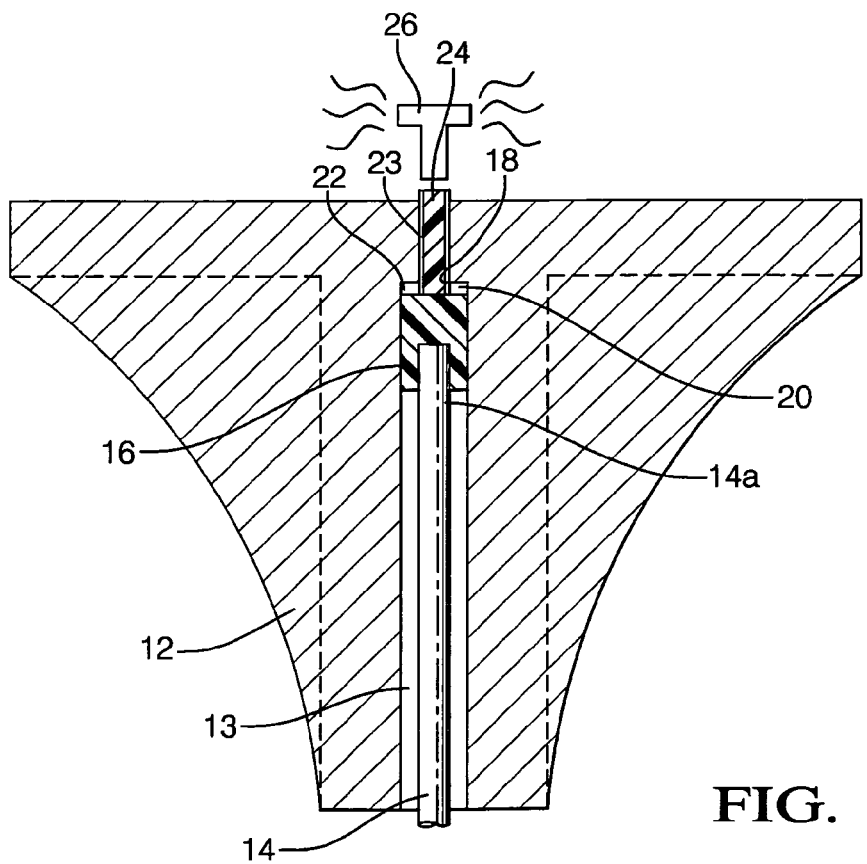
FIG. 2 is a cross-sectional side view of a portion of a shaft assembly in accordance with a second embodiment of the present invention.

Assembly and delashing of the shaft assembly will now be discussed with reference to the embodiments shown in FIGS. 2 and 3. Referring to FIG. 2, a bushing 16 is inserted into bore 13 and a plug 24 is inserted into bore constriction 23 to abut plug 24. In an embodiment where the plug and bushing are formed unitarily (as in FIG. 4), the bushing-plug combination may simply be inserted into the near end of bore 13 prior to insertion of the shaft therein. Inserted into the bore as such, plug 24 is in fluid communication with cavity 20. Shaft 14 is inserted into the bore and is piloted into bushing cavity 16b. The material of plug 24 is then melted by application of heat (for example, by contact with a hot tool 26). Melted filler material flows along channels 24b (FIG. 3) formed in plug 24 and then into cavity 20, until the cavity is substantially filled. Simultaneously with the melting of the plug, tool 26 also applies an axial compressive load to plug base portion 24a which is transferred to bushing 16 and, thence, to shaft end 14a. This compressive load is maintained while tool 26 is engaged with and melting plug 24. When the filler material in cavity 20 cools or hardens, bushing 16 is secured in its position within bore 13, whereby the bushing still maintains a compressive axial load on shaft 14 to delash the shaft.

Other methods for applying heat to melt the plug are also contemplated. However, any method used to heat the plug should simultaneously provide, or facilitate application and maintenance of, an axial compressive load to the shaft, as previously described.

In another particular embodiment (not shown), a longitudinal bearing member is provided for insertion into bore constriction 23 to abut bushing 16. The bearing member is engageable by a tool outside the bore constriction to transmit an axial compressive force from the tool to bushing 16 and thereby from the bushing to the shaft. The bearing member may be, for example, a solid shaft or a hollow shaft (for example, a syringe-like structure) capable of conveying therethrough a suitable filler material from a reservoir to cavity 20 to fill the cavity. In this embodiment, a suitable filler material is injected into cavity 20, the filler material traveling either along an exterior of the bearing member or within and through a passage formed within the bearing member.

The delash mechanisms and methods described herein are relatively simple and low cost. The number of components used in the assembly may be reduced in comparison to existing methods, and assembly is greatly simplified, thus lowering labor, equipment, and purchased part costs.

Although the structures and assembly methods set forth herein were described with reference to their application in a power telescoping steering system, the structures and assembly methods set forth herein may be applied in delashing any suitable shaft assembly.

It will be understood that the foregoing description of the present invention is for illustrative purposes only, and that the various structural and operational features herein disclosed are susceptible to a number of modifications, none of which departs from the spirit and scope of the present invention. The preceding description, therefore, is not meant to limit the scope of the invention. Rather, the scope of the invention is to be determined only by the appended claims and their equivalents.

What is claimed is:

1. A method for delashing a shaft in a shaft assembly, comprising the steps of:

providing a housing having a bore extending therethrough for receiving a shaft therein, the bore including a shoulder extending into the bore and a bore constriction extending from the shoulder to an exterior surface of the housing;

providing a bushing on an end of the shaft such that at least a portion of the bushing is spaced apart from the shoulder to define a cavity therebetween when the shaft is positioned within the bore;

providing a solid plug insertable into the bore constriction, the plug having a base portion and a plurality of arcuate-shaped channels disposed longitudinally along an exterior of the base portion and spaced apart from one another;

positioning the plug in the bore constriction so as to abut the bushing and so as to be in fluid communication with the cavity when the plug is not melted;

applying an axial compressive load to the plug, whereby the axial compressive load is transferred to the shaft via the plug and the bushing abutting the plug; and melting a material of the plug in the bore constriction after the plug is positioned in the bore constriction such that the melted material flows along the channels formed in the plug and into the cavity to substantially fill a space between the shoulder and the bushing to engage the bushing and the shoulder for maintaining an axial compressive load on the shaft.

2. The method of claim 1 wherein the step of providing a bushing on an end of the shaft comprises the step of forming the bushing unitarily with the plug.

3. The method of claim 1, wherein the plurality of arcuate-shaped channels comprise at least three arcuate-shaped channels.

4. The method of claim 1, wherein the plurality of arcuate-shaped channels comprise a plurality of concave channels extending inwardly toward the longitudinally extending axis.

5. The method of claim 1, wherein the plurality of arcuate-shaped channels comprise a plurality of concave channels extending inwardly relative to the exterior of the base portion.

6. The method of claim 1, wherein the material of the plug contacts the shoulder and further contacts only an end flat surface of the bushing, after being melted.

7. The method of claim 1, wherein the applying the axial compressive load to the plug comprises contacting a tool against a portion of the plug when the plug is in the bore constriction to apply the axial compressive load to the plug.

8. The method of claim 1, wherein the melting the material of the plug in the bore constriction comprises contacting a hot tool against a portion of the plug when the plug is in the bore constriction to melt the material of the plug in the bore constriction.

* * * * *